(12) United States Patent
Shin (10) Patent No.: US 8,243,408 B2
(45) Date of Patent: Aug. 14, 2012

(54) APPARATUS AND METHOD FOR PREVENTING REVERSE POWER FLOW OF OVER CURRENT RELAY

(75) Inventor: Dong-Yeol Shin, Daejeon (KR)

(73) Assignee: Korea Electric Power Corporation, Gangnam-gu (KR)

( * ) Notice: Subject to any disclaimer, the term of this patent is extended or adjusted under 35 U.S.C. 154(b) by 377 days.

(21) Appl. No.: 12/580,502

(22) Filed: Oct. 16, 2009

(65) Prior Publication Data

US 2010/0103577 A1    Apr. 29, 2010

(30) Foreign Application Priority Data

Oct. 28, 2008  (KR) .................. 10-2008-0106159

(51) Int. Cl.
*H02H 3/00* (2006.01)

(52) U.S. Cl. ........................................... 361/84
(58) Field of Classification Search ...................... 361/84
See application file for complete search history.

(56) References Cited

U.S. PATENT DOCUMENTS

| | | | | | |
|---|---|---|---|---|---|
| 2,027,221 | A | * | 1/1936 | Bostwick | 361/59 |
| 3,396,310 | A | * | 8/1968 | Logan | 361/20 |
| 4,876,624 | A | * | 10/1989 | Chow | 361/87 |
| 2008/0277945 | A1 | * | 11/2008 | Lorenz | 290/40 A |
| 2010/0010684 | A1 | * | 1/2010 | Lorenz et al. | 700/293 |

FOREIGN PATENT DOCUMENTS

| | | |
|---|---|---|
| JP | 2-101549 | 4/1990 |
| JP | 6-242724 | 9/1994 |
| JP | 8-241668 | 9/1996 |
| KR | 2009-0032532 | 4/2009 |

OTHER PUBLICATIONS

Korean Office Action issued in Korean Patent Application No. 10-2008-0106159 dated Nov. 29, 2010.
Korean Office Action issued in Korean Patent Application No. 10-2008-0106159 dated Nov. 26, 2010.
Shin, D, et al. "A Study on the Reverse-Power-Flow Phenomenon due to Transformer Wiring Types in Distribution System". Journal of the Korean Institute of Illuminating and Electrical Installation Engineers. Vol. 22, No. 9, pp. 111-119. Sep. 2008.

* cited by examiner

*Primary Examiner* — Ronald W Leja
(74) *Attorney, Agent, or Firm* — McDermott Will & Emery LLP (57) ABSTRACT

Provided is an apparatus and method for preventing reverse power flow of an over current relay. When a neutral line current is greater than a phase current, it is determined that a reverse power flow occurs, and thus a protection relay is prevented from malfunctioning. The apparatus for preventing reverse power flow of an over current relay includes: a detecting unit which detects a phase current and a neutral line current; a reverse power flow determining unit which is electrically connected to the detecting unit and compares the phase current and the neutral line current which are detected by the detecting unit to determine whether or not a reverse power flow occurs; a setting unit which is electrically connected to the reverse power flow determining unit and sets an operation time and the number of operation times of a protection relay; and an operation unit which is electrically connected to the setting unit and operates the protection relay in a manner set by the setting unit.

8 Claims, 13 Drawing Sheets

APPARATUS AND METHOD FOR PREVENTING REVERSE POWER FLOW OF OVER CURRENT RELAY

CROSS-REFERENCE TO RELATED APPLICATION

This application claims priority to and the benefit of Korean Patent Application No. 2008-0106159, filed on Oct. 28, 2008, the disclosure of which is incorporated herein by reference in its entirety.

BACKGROUND

1. Field of the Invention

The present invention relates to an apparatus and method for preventing reverse power flow of an over current relay (OCR), and more particularly, to an apparatus and method for preventing reverse power flow of an over current relay, which can prevent a protection relay from malfunctioning due to reverse power flow in a distribution system.

2. Discussion of Related Art

Generally, when a line fault or load unbalance occurs in a line interconnected with a distributed generation, a substation circuit breaker, a recloser of a distribution line, an over current relay (OCR) or an over current ground relay (OCGR) of a client circuit breaker malfunctions due to reverse power flow caused by a connection (Y-$\Delta$ or Y-$\Delta$-Y) of a transformer.

This way of transformer connection makes the system analysis complicated and causes "false FI information" to be displayed on a screen of a distribution automation system when a distribution line fault occurs, which results in various problems such as a mistake in operation or a delay of fault recovery time.

In order to detect the reverse power flow, a directional over current relay (DOCR) which detects both a voltage and a current has to be installed instead of a protection relay which detects only a current. The directional over current relay detects the direction of power flow to prevent the protection relay from malfunctioning when the reverse power flow occurs.

However, a recloser or a circuit breaker installed in a distribution system which is in general use is a protection device which detects only the current through a current transformer and does not have an algorithm for detecting the reverse power flow, and a method of additionally detecting the voltage is technically impossible.

The substation circuit breaker, the recloser of the distribution line, and a client circuit breaker may malfunction due to the reverse power flow. In particular, when a distribution system is interconnected with a distributed generation such as a solar photovoltaic power generation or a wind power generation, a Y-$\Delta$ connection is applied to an interconnecting transformer, and thus the reverse power flow severely occurs.

The directional over current relay has the function to set manually among the forms of forward direction, reverse direction and directionlessness. When a short circuit fault occurs, the directional over current relay operates normally, but when a ground fault occurs, it operates abnormally because a power flow direction changes with respect to the position of ground fault of each phase.

When a fault occurs at a power source side, a person in charge has to always stay in a substation due to the malfunction of the protection relay, or when a fault occurs at a load side in the distribution automation system, much time and manpower are required to find the fault position.

In particular, when a ground fault occurs in the same bank of the substation during distribution system operation, the substation circuit breaker disposed in a neighboring line, the recloser of the distribution line, the ground installed in a client circuit breaker and the current relay cannot detect the directivity by the reverse power flow and frequently malfunctions, whereby the power failure area increases.

SUMMARY OF THE INVENTION

The present invention is directed to an apparatus and method for preventing reverse power flow of an over current relay, which can allow a protection relay to normally operates, when a fault occurs at a load side of the protection relay and prevent the protection relay from malfunctioning when a fault occurs at a power source side of the protection relay.

The present invention is also directed to an apparatus and method for preventing reverse power flow of an over current relay, which can prevent a protection relay from malfunctioning due to reverse power flow when a fault occurs at a power source side of the protection relay.

According to an aspect of the present invention, there is provided an apparatus for preventing reverse power flow of an over current relay, the apparatus including: a detecting unit which detects a phase current and a neutral line current; a reverse power flow determining unit which is electrically connected to the detecting unit and compares the phase current and the neutral line current which are detected by the detecting unit to determine whether or not a reverse power flow occurs; a setting unit which is electrically connected to the reverse power flow determining unit and sets an operation time and the number of operation times of a protection relay; and an operation unit which is electrically connected to the setting unit and operates the protection relay in a manner set by the setting unit.

The apparatus for preventing reverse power flow may further include: a blocking relay which prevents the protection relay from malfunctioning, wherein the blocking relay includes: a current detection terminal which is electrically connected to a terminal of a current detecting current transformer in the protection relay; and an operation unit which is electrically connected to a secondary side of the current detecting current transformer in the protection relay and an electronic circuit. The reverse power flow determining unit may further include a fault current determining circuit which compares a set current for preventing the protection relay from malfunctioning with a detection current and determines that a fault current is generated when the detection current is greater than the set current.

According to an aspect of the present invention, there is provided a method for preventing reverse power flow of an over current relay, the method including: detecting a phase current and a neutral line current through a detecting unit; and comparing the phase current with the neutral line current to determine whether or not a reverse power flow occurs and determining whether or not to operate a protection relay when it is determined that the reverse power flow occurs.

The comparing of the phase current with the neutral line current may include: determining that a normal power flow occurs when the phase current is greater than the neutral line current in consideration of errors of the phase current and the neutral line current and allowing the protection relay to operate; and determining that the reverse power flow occurs when the neutral line current is greater than the phase current and allowing the protection relay not to operate.

The method for preventing reverse power flow may further include: before the comparing of the phase current with the neutral line current, providing a blocking relay for preventing a malfunction of the protection relay; and comparing a set current with a detection current and determining that a fault current is generated when the detection current is greater than the setting current. The comparing of the phase current with the neutral line current may further include: allowing the protection relay not to operate when a fault occurs at a power source side centering on the protection relay; and allowing the protection relay not to operate when a fault occurs at a load side.

The method for preventing reverse power flow may further include, after the comparing of the phase current with the neutral line current, determining that the reverse power flow occurs when the neutral line current is greater than the phase current ( ) and allowing the blocking relay to operate.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail below with reference to the accompanying drawings such that those skilled in the art to which the present invention pertains can easily practice the present invention.

Like reference numerals designate like elements throughout the specification. In addition, when a unit or element is "electrically coupled" to another unit or element, it can be directly connected to another unit or element or be indirectly connected to another unit or element with one or more intervening units or elements interposed therebetween.

Figure 1:
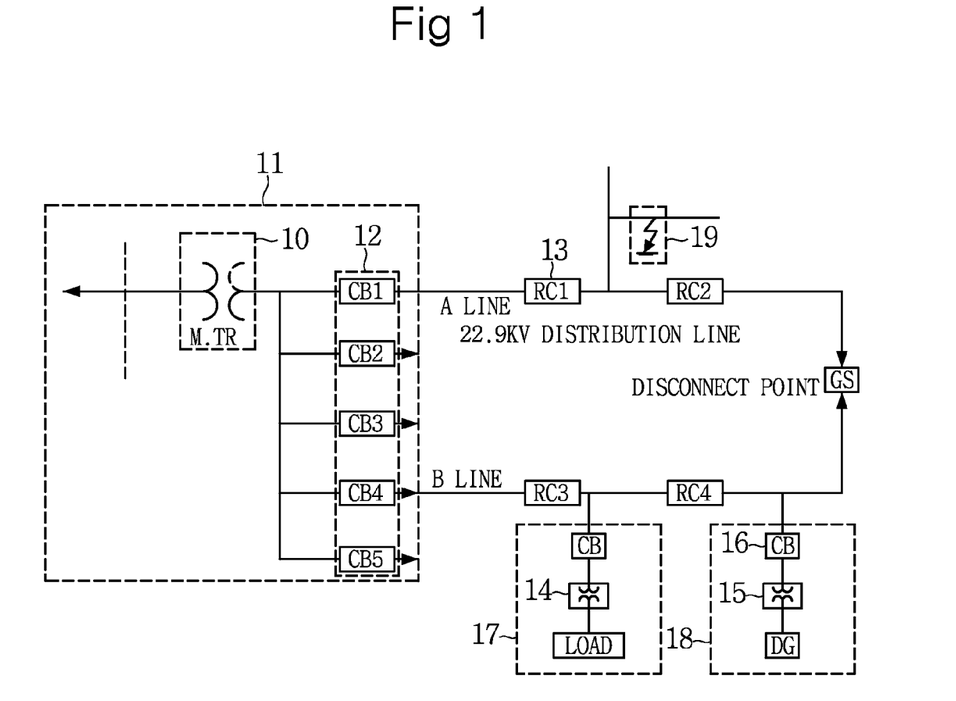
FIG. 1 is a single-line diagram for explaining a configuration of a general distribution system.

FIG. 1 is a single-line diagram for explaining a configuration of a general distribution system.

As illustrated in FIG. 1, a main transformer 10 of a 154 KV/22.9 KV substation 11 has a Y-$^\Delta$-Y connection, a receiving client transformer 14 in a receiving client section 17 has a $^\Delta$-Y connection between a circuit breaker (CB) and a load, and a generating client transformer 15 in a generating client section 18 has a Y-$^\Delta$ or Y-$^\Delta$-Y connection between a circuit breaker and a distributed generator (DG). A substation circuit breaker 12 which protects the overall system, a recloser (RC) 13 which protects a distribution line, and a client circuit breaker 16 which protects client equipment are further provided.

For example, when a single-phase ground fault 19 occurs in an intermediate position of the distribution line, a first recloser RC1 and a first circuit breaker CB1 have to operate depending on the amplitude of a fault current, and remaining protection relays do not have to operate. However, there occurs a phenomenon that ground protection relays of a fourth circuit breaker CB4, a third recloser RC3, a fourth recloser RC4, and the client circuit breaker 16 of B line interconnected with a distributed generation malfunction. In particular, since an over current ground relay of the client circuit breaker 16 has a very low set value, it may malfunction due to a unbalanced load of the power system. GS is a gas switch at a Disconnect Point between lines.

Figure 2:
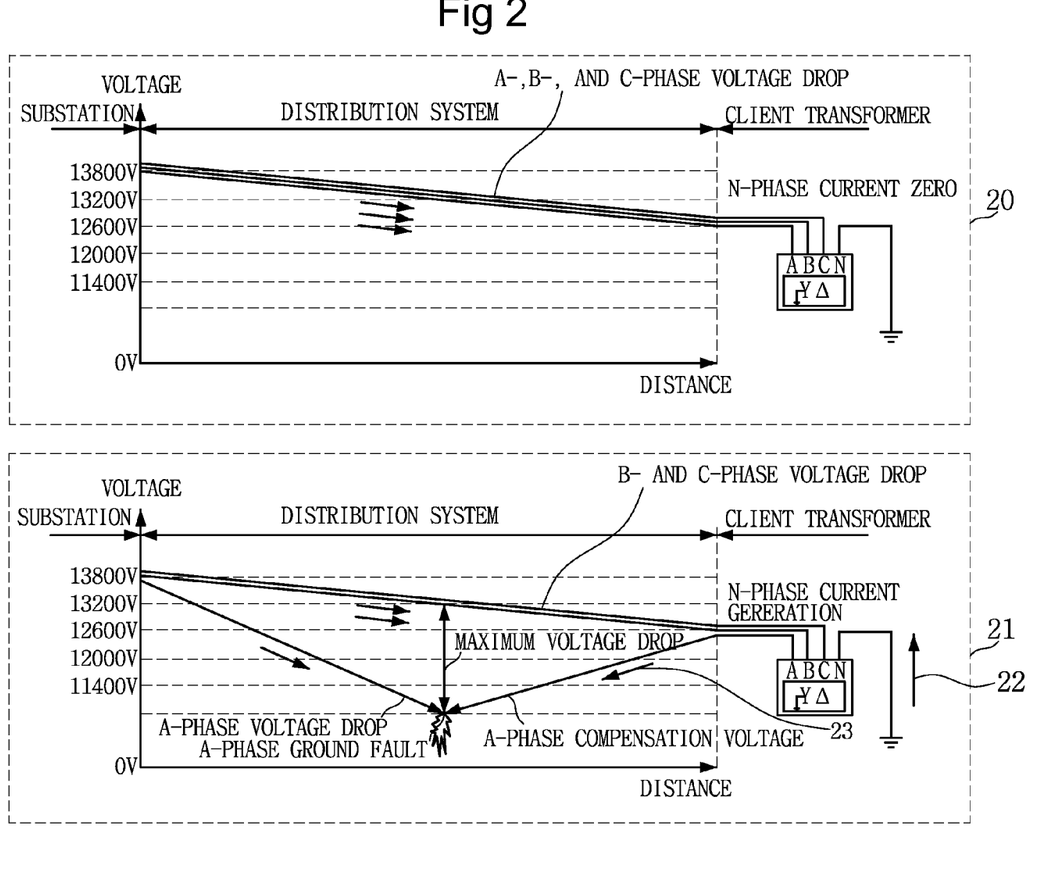
FIG. 2 is a graph illustrating a power flow direction and a voltage drop to explain a reverse power flow before and after an A-phase ground fault occurs in the distribution system of FIG. 1.

FIG. 2 is a graph illustrating a power flow direction and a voltage drop to explain a reverse power flow before and after an A-phase ground fault occurs in the distribution system.

As illustrated in FIG. 2, power flow directions in a normal state 20 is shown such that forward power flows of respective phases are generated in a uniform manner from a substation to a load end. And N-phase current may not exist. Three-phase voltages steadily drop according to the distance and the amplitude of a load as it is closer to the load end from the substation. However power flow directions 21 when an A-phase ground fault occurs, forward power flow directions of A, B and C phases are generated from the substation to a fault position and an A-phase voltage abruptly drops at the fault position, while B and C-phase voltages are normally supplied. And N-phase current 22 here is generated. At this time, the A-phase voltage is compensated by a reverse voltage drop through the B- and C-phase voltages normally supplied from the generating client transformer 15. Therefore, with respect to the A phase, a reverse power flow 23 occurs from the generating client transformer to the fault position, and with respect to the B and C phases, the forward power flows are generated.

Figure 3:
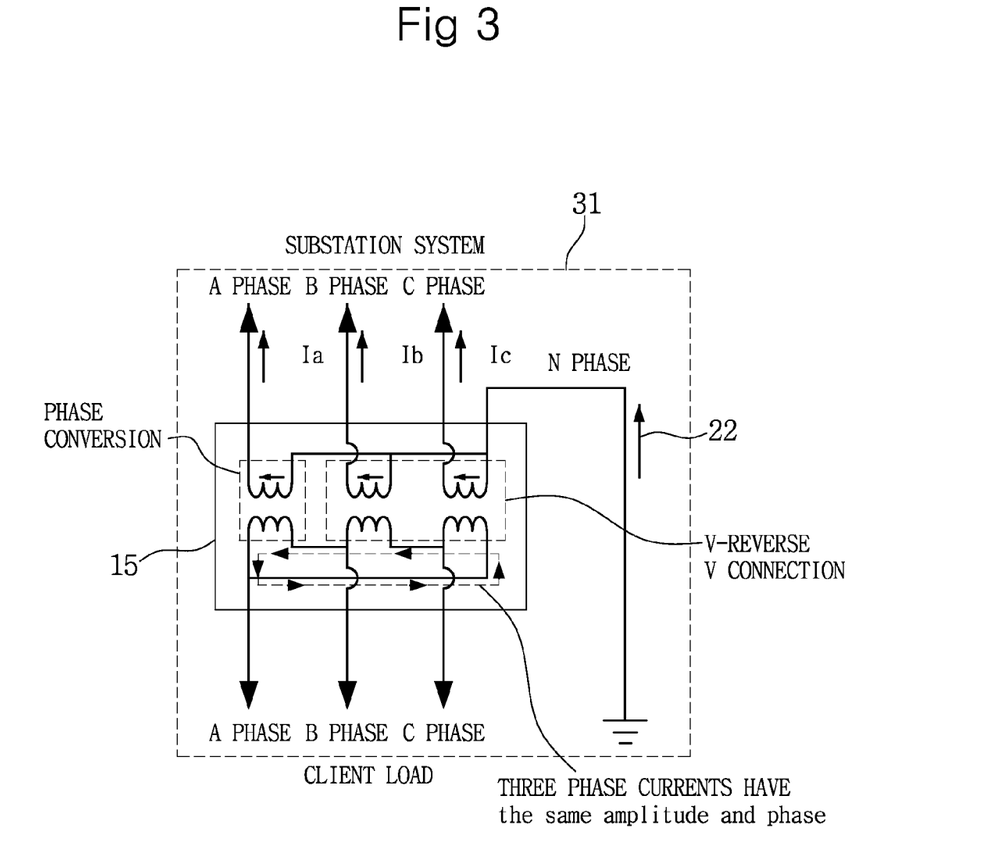
FIG. 3 is a system diagram illustrating an over current phenomenon of a neutral line when a reverse power flow occurs.

FIG. 3 is a system diagram illustrating an over current phenomenon of a neutral line when the reverse power flow occurs.

As illustrated in FIG. 3, when a single-phase ground fault occurs, a neutral line current is generated as much as three times the phase current. The reason for this is that an interconnecting transformer in a generating client section (15 in FIG. 1) has Yg-$^\Delta$. connection to ground a first neutral point. When a single-phase ground fault, a line open circuit fault, or an unbalanced load occur, the voltage of one phase abruptly drops. At this time, since the interconnecting transformer supplies electric power in a form in which remaining two phase voltages are reverse V-connected, the voltage is supplied from a secondary side to a primary side, thus causing a reverse power flow.

For example, when an A-phase ground fault occurs, an A-phase voltage drops, and B- and C-phase voltages are normally supplied to the interconnecting transformer. At this time, a primary side input is supplied in a two-phase three-line form of B, C, and N phases, and three phase voltages are generated in a reverse V connection form at a secondary side. An imaginary A-phase voltage generated by a secondary side delta ($\Delta$) connection is reversely phase-converted to a primary side to compensate by a voltage drop in a system, whereby the reverse power flow occurs. And N-phase current 22 flows.

When the reverse power flow occurs, A-, B-, and C-phase currents which have the same amplitude and phase are generated. The reason for this is that as the phase currents are circulated in series due to the transformer secondary delta (Δ) connection, the currents have the same amplitude and phase, and thus the neutral line current of three times the phase currents is generated. The reverse power flow (23 in FIG. 2) generated in the A phase is equal to a sum of B- and C-phase forward power flows.

Moreover, when a reverse power flow occurs, the direction of power flow of each phase may be changed. So, it may be determined as a reverse power flow when any one of phase among A-, B-, and C-phase differs from the other phase.

Figure 4:
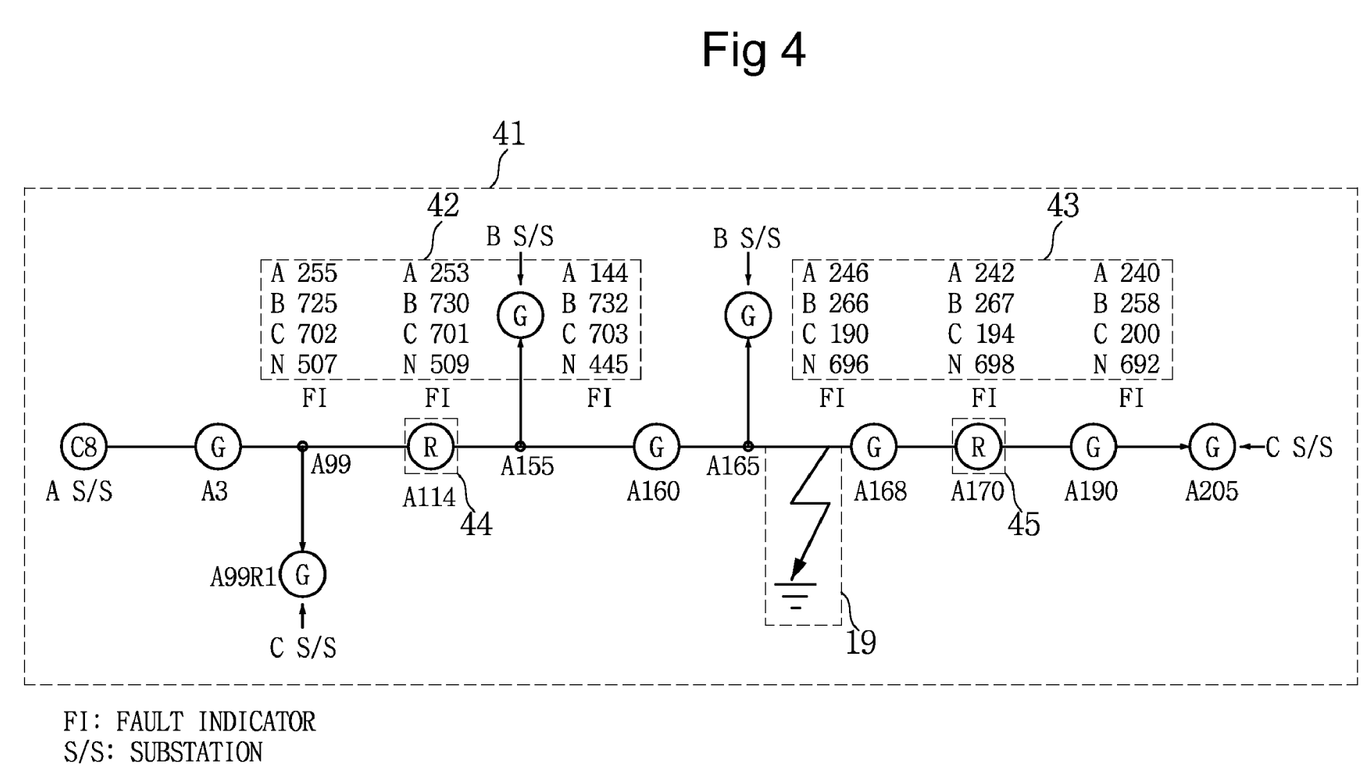
FIG. 4 is a screen of a distribution automation system for explaining an example of false fault information generation and malfunction of a recloser when a distribution line fault occurs.

FIG. 4 illustrates a screen of a distribution automation system for explaining an example of false fault information generation and malfunction of a recloser when a distribution line fault occurs.

As illustrated in FIG. 4, when "false FI (Fault Indicator) generation information" is generated in the distribution automation system 41, a malfunction may occur. A protection equipment of a distribution line includes a backup recloser 44 and a potential recloser 45.

For example, in the event that a fault occurs due to a defective cable at a position 19 between A160 and A168, a fault current of each phase of the distribution automation system has to show a fault information 42 only in switch A3, A114 and A160, but it may show a fault information 43 in switch A168, A170 and A190.

The reason why it works wrongly is because a connection of a interconnecting transformer in a generating client section (15 in FIG. 1) after A190 is a Yg-Δ connection and a FI works wrongly by a reverse power flow when a power source side ground fault occurs. Furthermore, a previous protection relay operates according to the amount of current. So, it cannot be understood whether the fault exists in source side or in load side.

In particular, at the time of a normal operation when the FI displays fault information 42, the phase current is greater than the neutral line current, while at the time of a false operation when the FI displays fault information 43, a neutral line current is greater than a phase current.

Therefore, the main purpose of this disclosure is in order not to generate a false operation which can be indicated in a fault information 43 and it provides an algorithm that it blocks a protection unit not to operate when a neutral line current is greater than a phase current (then, the direction of power flow of each phase may be changed and the power flow direction of any one of the three phase may differ from the others.) and it operates normally when a phase current is greater than a neutral line current in order not to operate wrongly when a source side fault occurs.

By this algorithm, it can be understood whether a fault exists in a source side or in a load side by comparing the amplitude of a respective phase current and the amplitude of a neutral line current It is analyzed that the fault is caused because the interconnecting transformer at a fault line end has a Yg-Δ connection 15 and so a fault indicator malfunctions due to the reverse power flow when the power source side ground fault 19 occurs.

Figure 5A:
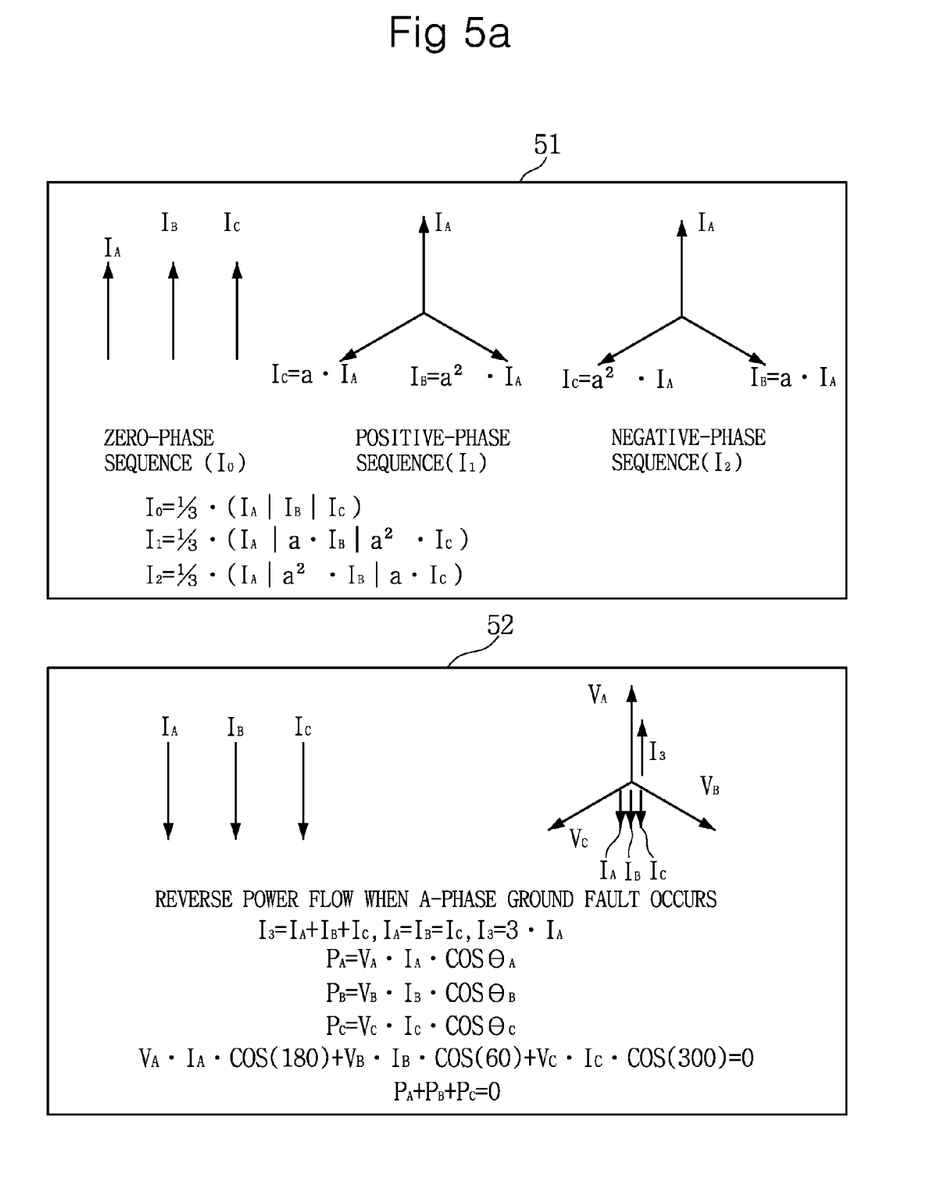
FIG. 5A is an explanation view for symmetrical coordinate method analysis and reverse power analysis by a transformer when a single-phase ground fault occurs.

FIG. 5A is an explanation view for a three-phase symmetrical coordinate method analysis and interconnecting transformer analysis to calculate a fault current.

As illustrated in FIG. 5A, when the single-phase ground fault occurs, in a state in which the reverse power flow is not considered, the amplitude of a fault current of each phase is computed such that the amplitudes of a zero-phase sequence component, a positive-phase sequence component, and a negative-phase sequence component are computed through a three-phase symmetrical coordinate method 51 and these amplitudes are used to compute the amplitude of the fault current. However, the amplitude values of the fault currents generated by an actual reverse power current are significantly different from each other.

Therefore, when the amplitude of the fault current is computed in consideration of the reverse power flow, the reverse power flow is such that $I_A$, $I_B$, $I_C$ currents have the same amplitude and the same phase by the interconnecting transformer analysis 52 in time of A-phase ground fault. In this case, currents of each phase at a point where the reverse power flow occurs is such that a neutral line current is three times the phase current and flows in a direction opposite to the direction of a zero-phase sequence component.

Figure 5B:
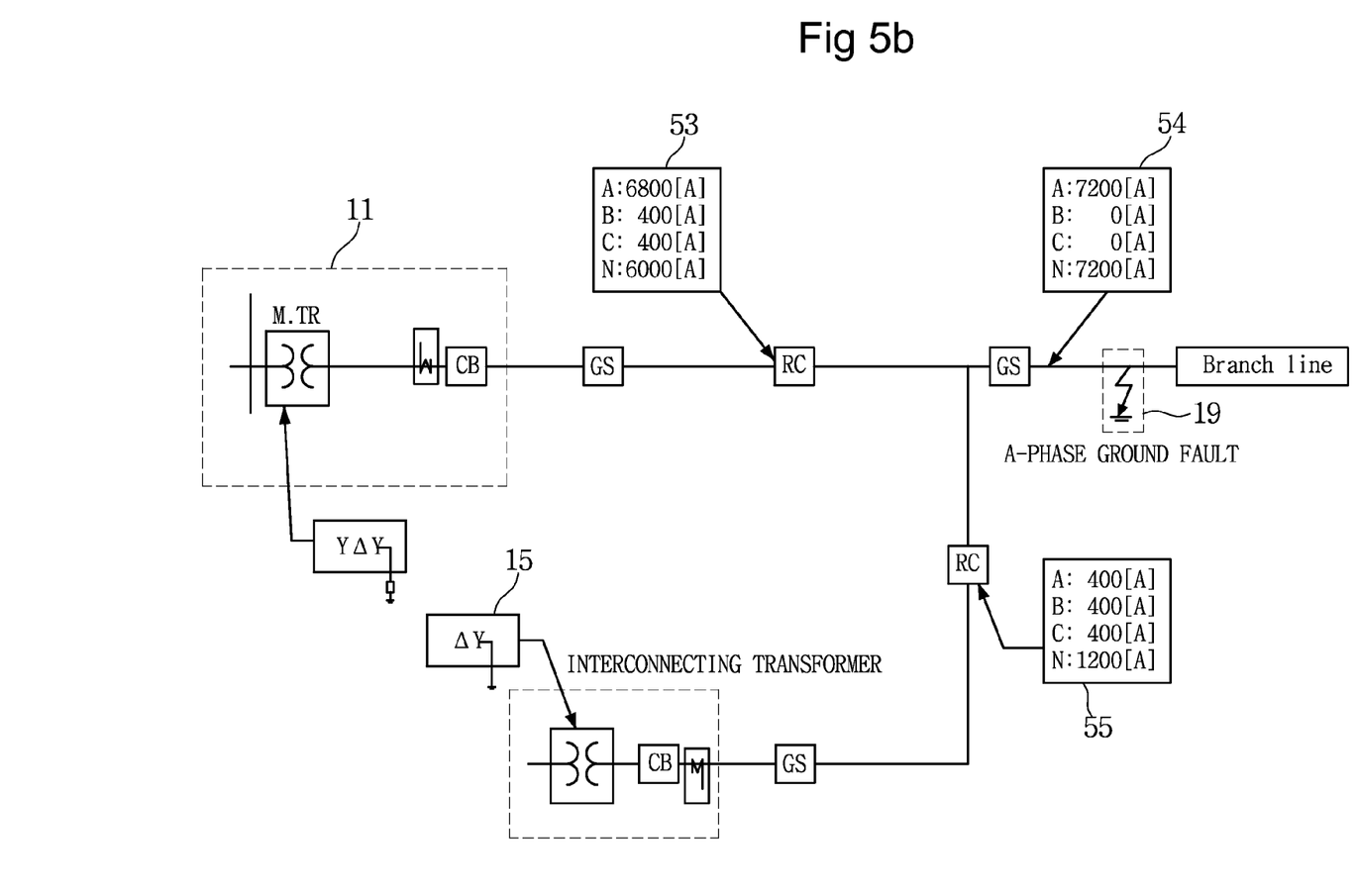
FIG. 5B illustrates the amplitude of fault current for each phase in each phase when an A-phase ground fault occurs.

FIG. 5B illustrates the amplitude of fault current for each phase in each phase when an A-phase ground fault occurs.

As illustrated in FIG. 5B, when an A-phase ground fault 19 occurs in a branch line, the amplitude of a fault current of each section is detected in a distribution automation system. The amplitude of the fault current may be analyzed into a power source side section 53, a fault occurrence section 54, and a reverse power flow occurrence section 55 by a Y-Δ interconnecting transformer as follows.

The amplitudes of the respective phase currents in the power source side section 53 are represented as 6800[A], 400[A], 400[A], and 6000[A] for A, B, C, and N phases, respectively. The amplitudes of the respective phase currents in the fault occurrence section 54 are represented as 7200[A], 0[A], 0[A], and 7200[A] for A, B, C, and N phases, respectively. The amplitudes of the respective phase currents in the reverse power flow occurrence section 55 are represented as 400[A], 400[A], 400[A], and 1200[A] for A, B, C, and N phases, respectively.

As such, due to the reverse power flow caused by the transformer connection, an N-phase current which is a neutral line current is generated three times the A, B, and C phase currents which are phase currents, thus causing an over current ground relay to malfunction.

Figure 5C:
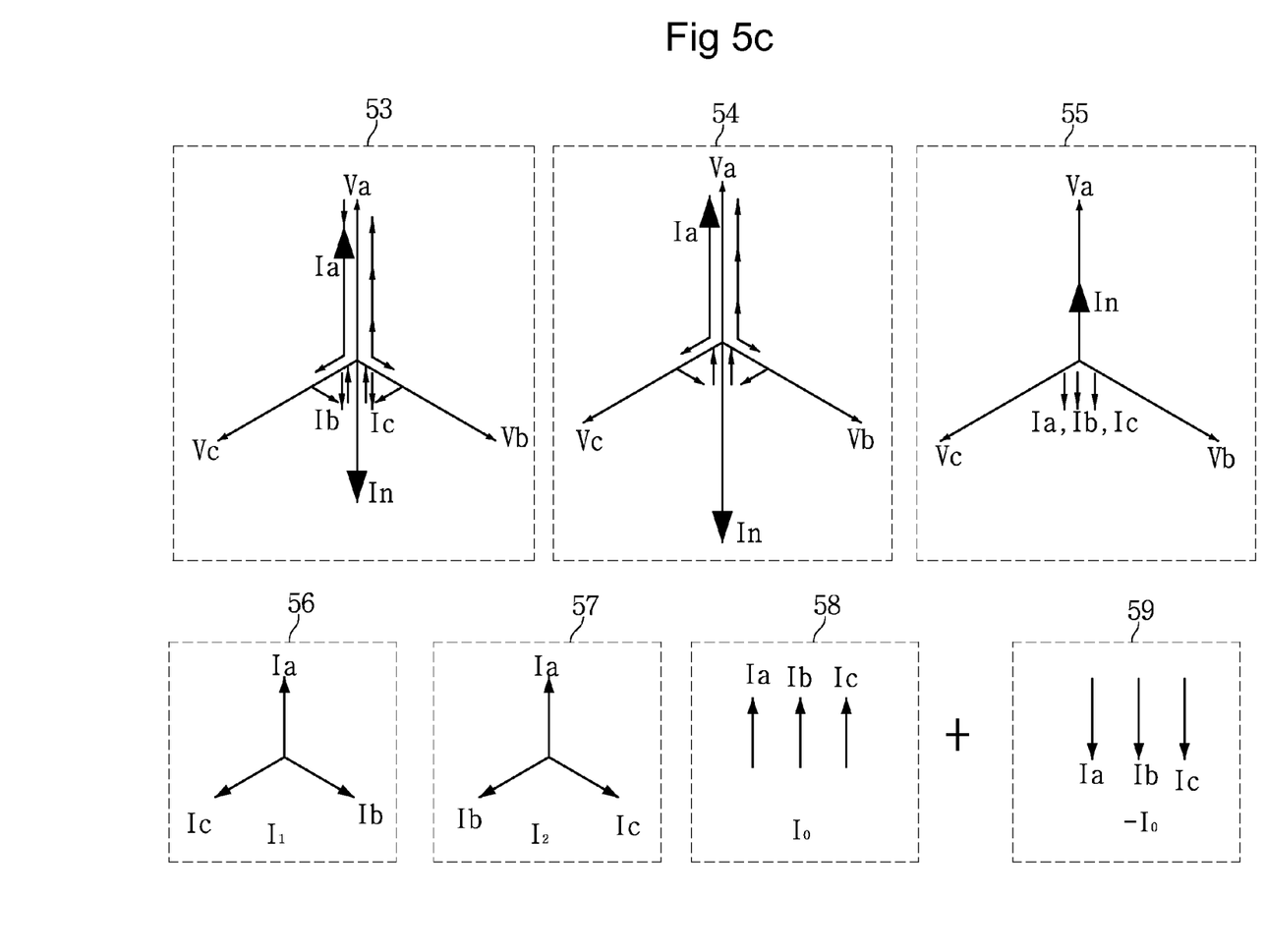
FIG. 5C illustrates vector analysis for the amplitude of fault current for each phase in each section when an A-phase ground fault occurs.

FIG. 5C illustrates vector analysis for the amplitude of fault current for each phase in each section when the A-phase ground fault occurs.

As illustrated in FIG. 5C, when the A-phase ground fault occurs, the amplitudes of the respective phase currents in the power source side section 53, the fault occurrence section 54, and the reverse power flow occurrence section 55 are represented as vectors. In order to analyze the amplitudes of the fault currents using a three-phase symmetrical coordinate method, a positive-phase sequence 56 current, a negative-phase sequence 57 current, and a zero-phase sequence 58 are represented as vector diagrams, and the fault currents of the respective sections are analyzed in consideration of the reverse power flow component 59.

A method for preventing a protection relay from malfunctioning due to a reverse power flow in accordance with the present invention may include a method of using an electronic protection relay and a method of using a mechanical protection relay. The method of using the electronic protection relay is to add an algorithm for determining a reverse power flow, and the method of using the mechanical protection relay is to configure a blocking relay to prevent an over current relay or an over current ground relay from malfunctioning.

Figure 6A:
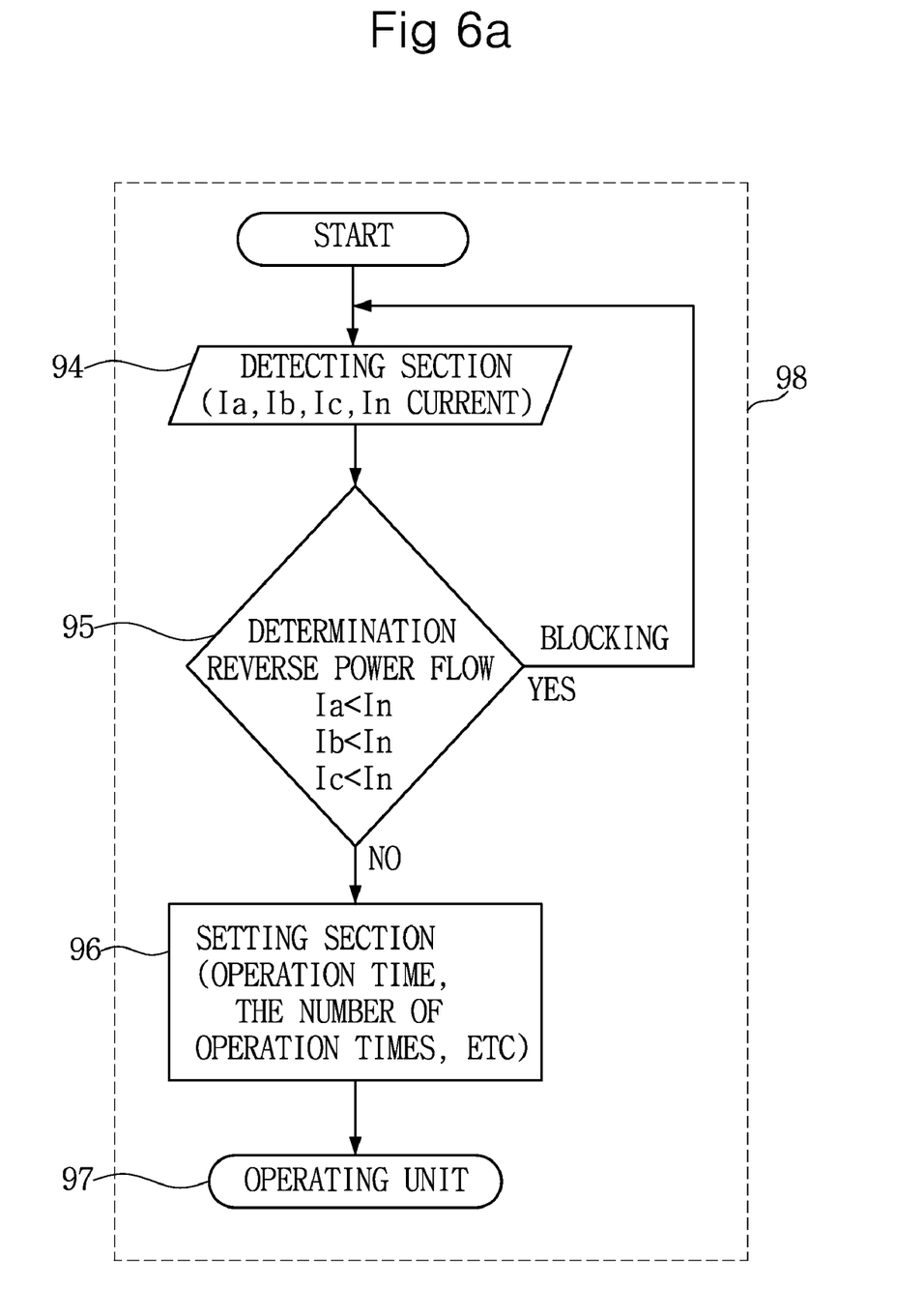
FIG. 6A illustrates an algorithm for preventing reverse power flow of an electronic protection relay according to an exemplary embodiment of the present invention.

FIG. 6A illustrates an algorithm for preventing reverse power flow of an electronic protection relay according to an exemplary embodiment of the present invention.

As illustrated in FIG. 6A, a reverse power flow preventing algorithm 98 includes a detecting section 94, a reverse power flow determining section 95, a setting section 96, and an operating section 97.

The detecting section 94 detects a phase current and a neutral line current. That is, the detecting section 94 detects A-, B-, and C-phase currents (Ia, Ib, and Ic) which are the phase currents and an N-phase current (In) which is the neutral line current.

The reverse power flow determining section 95 determines that the reverse power flow occurs when the neutral line current In is greater than the A-, B-, and C-phase currents (Ia, Ib, and Ic) (then, the power flow direction of any one of the three phases may differ from that of the others.) and prevents the protection relay from malfunctioning.

The setting section 96 sets an operation time and the number of operation times of the protection relay depending on the reverse power flow determination by the reverse power flow determining section 95.

The operation section 97 operates the protection relay in a manner set by the setting section 96.

When a fault occurs, the reverse power flow preventing algorithm 98 allows the protection relay to operate only when the phase current is greater than the neutral line current (then, the power flow direction of any one of the three phases may differ from that of the others.) and allows the protection relay not to operate when the neutral line current is greater than the phase current.

FIGS. 6B through 7D are exemplary views for an embodiment of the algorithm of this disclosure. Therefore, the components in figures are not to be restricted to the terminology of the figures. The terminology used in this disclosure is to explain the specific embodiments, not to restrict this disclosure. Any singular expression, as far as it doesn't change the meaning of the expression, includes a plural expression thereof. Moreover, feature, figures, steps, movements, components, parts or combinations thereof in this disclosure are to be understood to specify the existence, not to exclude in advance the possibility of the existence of one or more other features, figures, steps, movements, components, parts or combinations thereof.

Figure 6B:
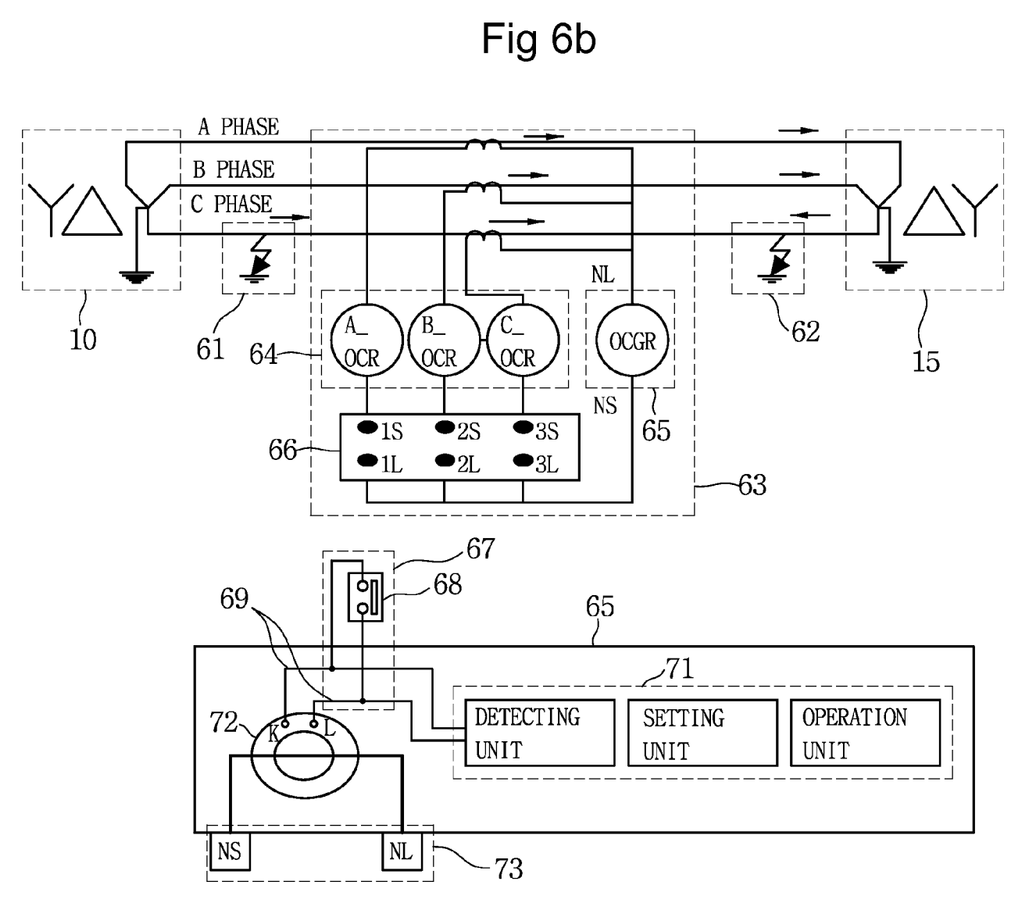
FIG. 6B is a view for explaining an operation principle and an installation method of a blocking relay included in a mechanical protection relay according to an exemplary embodiment of the present invention.

FIG. 6B is a view for explaining an operation principle and an installation method of a blocking relay included in a mechanical protection relay according to an exemplary embodiment of the present invention.

As illustrated in FIG. 6B, in order to prevent the mechanical protection relay from malfunctioning due to the reverse power flow, a blocking relay may be further configured to prevent the protection relay from malfunctioning due to the reverse power flow.

Generally, a protection relay 63 includes an over current relay 64 which protects the system in the event of a short circuit fault and an over current ground relay 65 which protects the system in the event of a ground fault. In an existing distribution system, since an N-phase current which is the neutral line current is generally greater than A-, B-, and C-phase currents (Ia, Ib, and Ic) when the reverse power flow occurs, the over current ground relay mainly malfunctions. Moreover, the power flow direction may be changed. This causes that the power flow direction of any phase of A-, B-, and C-phase differs from the power flow direction of the other phases. In order to prevent the over current relay or the over current ground relay from malfunctioning, a blocking relay is provided to allow the protection relay 63 not to operate when a power source side fault 61 based on the point of the protection relay 63 installment occurs and allow the protection relay 63 to normally operate when a load side fault 62 occurs.

In order to prevent the protection relay 63 from malfunctioning, the blocking relay is installed as follows. A current detecting terminal 66 of the blocking relay is connected to a current detecting current transformer of a conventional protection relay, and an operation unit of the blocking relay is further installed between wire lines which connect a secondary side of the current detecting current transformer 72 of the conventional protection relay to an electronic circuit 71, thus allowing the protection relay not to operate when the reverse power flow occurs. A secondary side of the current transformer must be bypassed through a bypass circuit 67 which is installed on the cable 69 in the secondary side of the current transformer in order not to make a mechanical protection relay wrongly. So, detecting whether a neutral line current is greater than phase currents when a ground fault occurs and bypassing by a bypass relay 68 at the secondary side of a current transformer prevent a protection relay from operating wrongly.

The blocking relay will be described in more detail with reference to FIGS. 7A to 7D below.

Figure 7A:
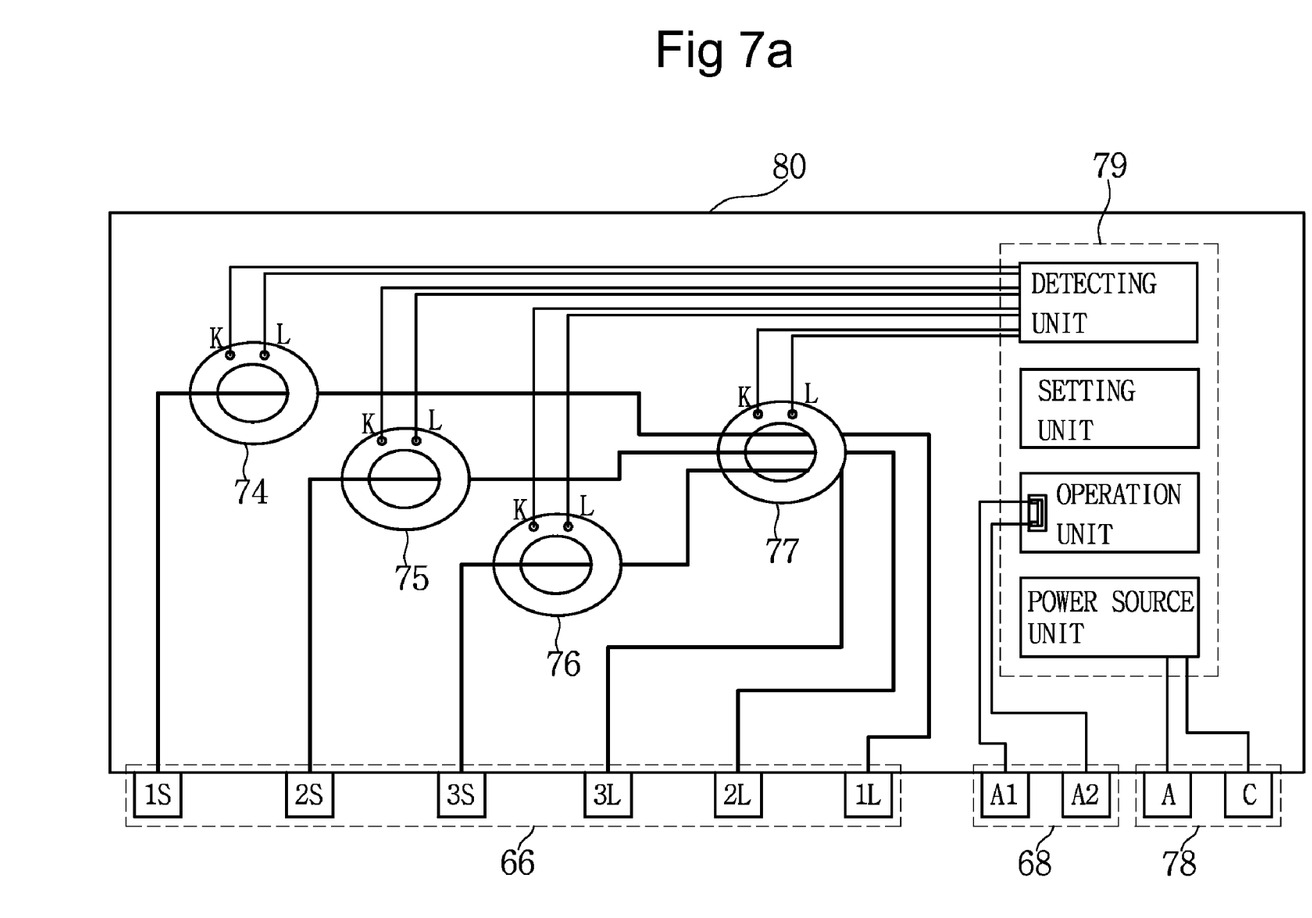
FIG. 7A illustrates an internal current transformer connection and a circuit configuration of a blocking relay according to an exemplary embodiment of the present invention.

FIG. 7A illustrates an internal current transformer connection and a circuit configuration of a blocking relay according to an exemplary embodiment of the present invention.

As illustrated in FIG. 7A, the blocking relay 80 includes an A-phase detection current transformer 74, a B-phase detection current transformer 75, a C-phase detection current transformer 76, and an N-phase detection current transformer 77.

A primary side of the A-phase detection current transformer 74 is connected to 1S and 1L of a current detection terminal 66, a primary side of the B-phase detection current transformer 75 is connected to 2S and 2L, and a primary side of the C-phase detection current transformer 76 is connected to 3S and 3L.

Primary side wire lines of the N-phase detection current transformer 77 are connected to 1S, 2S, and 3S and 1L, 2L, and 3L. Secondary side wire lines of the A-, B-, C-, and N-phase current transformers are connected to an internal electronic circuit 79 of the blocking relay. The internal electronic circuit 79 of the blocking relay includes a detection unit, a setting unit, an operation unit, and a power source unit. An operation point of the blocking relay is connected to A1 and A2 terminals of an output terminal 68, and the power source terminal 78 receives a free voltage.

Figure 7B:
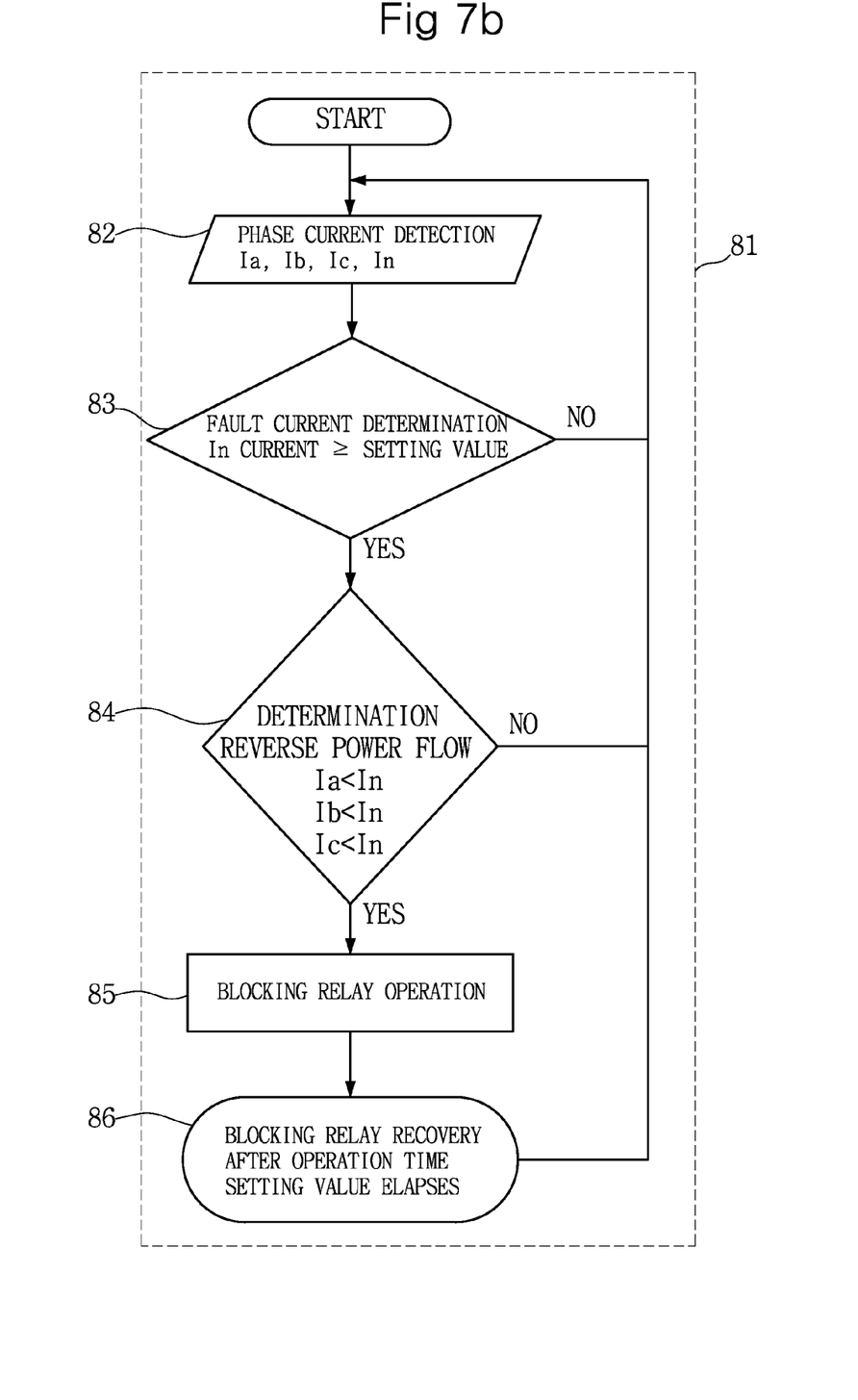
FIG. 7B illustrates an operation algorithm of an internal electronic circuit of a blocking relay according to an exemplary embodiment of the present invention.

FIG. 7B illustrates an operation algorithm 81 of the internal electronic circuit of the blocking relay according to an exemplary embodiment of the present invention.

As illustrated in FIG. 7B, the operation algorithm for operating the blocking relay includes a phase current detecting circuit 82, a fault current determining circuit 83, a reverse power flow determining circuit 84, a blocking relay operating circuit 85, and a relay recovery time setting circuit 86.

The phase current detecting circuit 82 detects currents through a phase detection current transformer and an N-phase detection current transformer, and the fault current determining circuit 83 determines the detection current as a fault current when the detection current is greater than a set current.

The reverse power flow determining circuit 84 determines that the reverse power flow occurs when the neutral line current is greater than the phase current (then, the power flow direction of any one of the three phases may differ from that of the others.) and thus operates the blocking relay. At this time, the relay recovery time setting circuit 86 operates the blocking relay during a set time and thereafter recovers the blocking relay to a normal state.

Figure 7C:
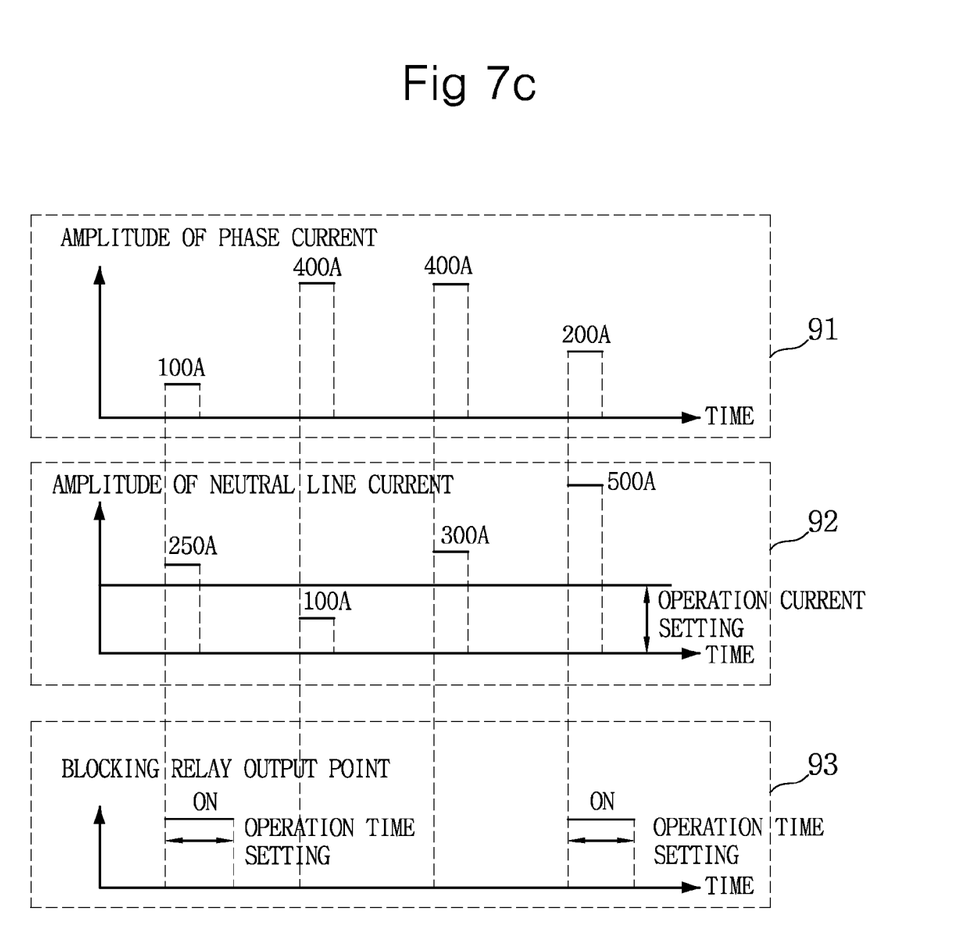
FIG. 7C illustrates time charts of phase input currents and an output contact point of a blocking relay for detecting reverse power flow according to an exemplary embodiment of the present invention.

FIG. 7C illustrates time charts of phase input currents and an output contact point 93 of the blocking relay for detecting reverse power flow according to an exemplary embodiment of the present invention.

As illustrated in FIG. 7C, it is determined by comparing the amplitude of the phase current with that of the neutral line current whether or not the reverse power flow occurs.

An amplitude of a phase current 91 is compared to an amplitude of a neutral line current 92 in which A, B, and C phases are vector-added. When the neutral line current is greater than the phase current, it is determined that the reverse power flow occurs. Therefore, the blocking relay operates when the neutral line current is greater than the phase current.

For example, the blocking relay operates when the detection current is greater than a fault determination current, and since 250[A] is greater than an operation determination current, it is determined that a fault occurs. At this time, the phase current (100[A]) is compared with the neutral line current (250[A]), and when the neutral line current is greater than the phase current, the blocking relay operates.

Further, when the phase current is 400[A] and the neutral line current is 100[A], the neutral line current is smaller than the fault determination current, and thus the blocking relay does not operate. When the phase current is 400[A] and the neutral line current is 300[A], since the neutral line current is greater than the fault determination current and the phase current is greater than the neutral line current, the blocking relay does not operate. A change of state of Blocking relay output point according to a reverse power flow is depicted in 93.

Figure 7D:
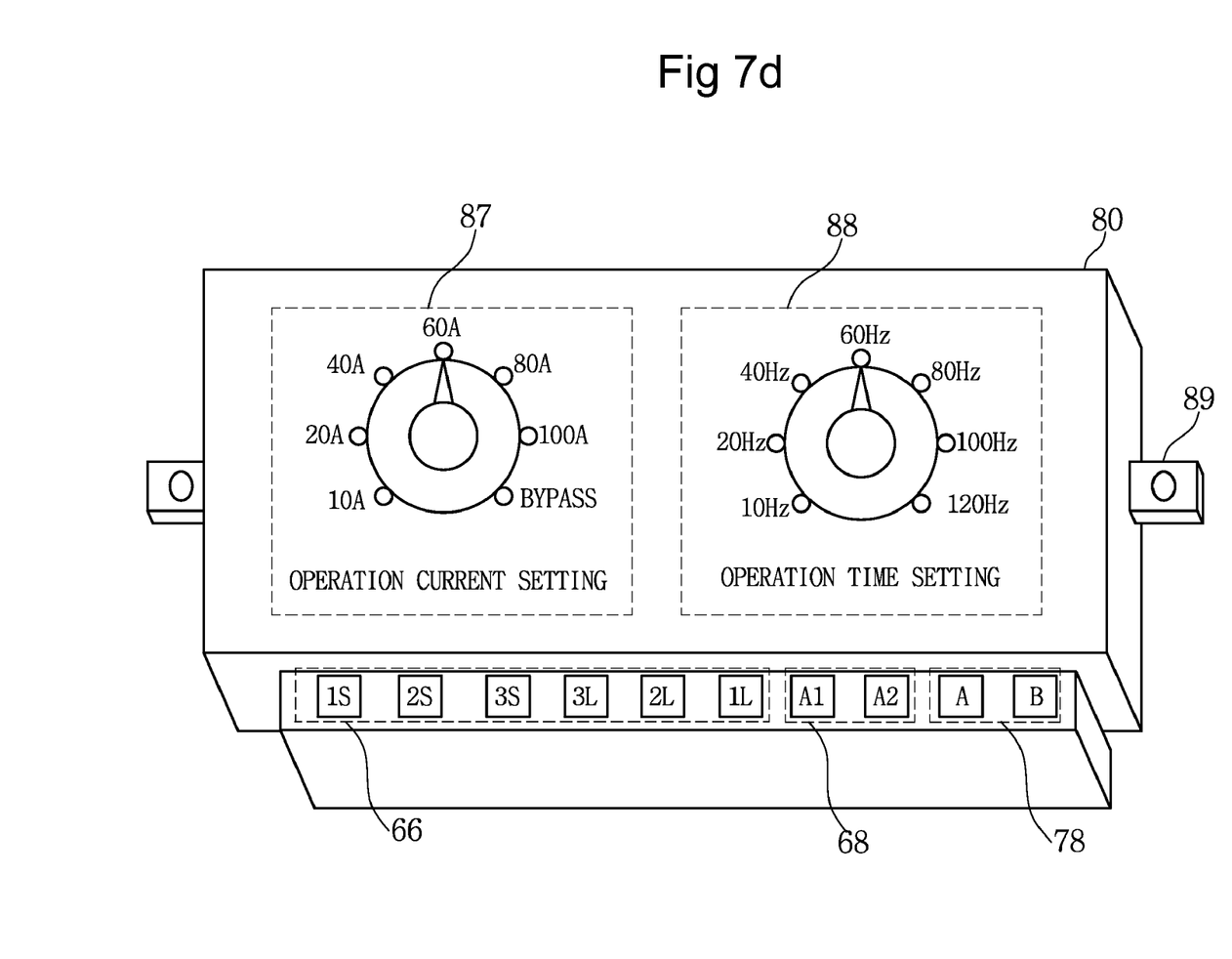
FIG. 7D illustrates an external form of a blocking relay according to an exemplary embodiment of the present invention.

FIG. 7D illustrates an external form of the blocking relay according to an exemplary embodiment of the present invention.

As illustrated in FIG. 7D, an external configuration of the blocking relay includes an operation current setting unit 87, an operation time setting unit 88, a blocking relay case 80, a fixing hole 89, a current detection terminal 66, a blocking relay output terminal 68, and a power source terminal 78. The operation current setting unit 87 has 10 A, 20 A, 40 A, 60 A, 80 A, 100 A, and bypass as setting values, and in the case of bypass, a function for detecting an operation current is stopped. For example, when the setting value is 60 A, the detection current is greater than 60 A, and thus it is determined that a fault occurs.

The operation time setting unit 88 functions to delay a blocking relay operation time. For example, assuming the an operation current is set to 60 A and an operation time is set to 60 Hz, when the detection current is equal to or greater than 60 A, it is determined that a fault occurs, and when the neutral line current is greater than the phase current, it is determined that the reverse power flow occurs. Therefore, the blocking relay operates in a moment, is maintained during 60 Hz, and is then recovered to a normal state.

As described above, according to the apparatus and method for preventing reverse power flow of the over current relay in accordance with the present invention, the protection relay normally operates when a fault occurs at the load side of the protection relay, and it is possible to prevent the protection relay from malfunctioning when a fault occurs at the power source side of the protection relay.

Further, according to the apparatus and method for preventing reverse power flow of the over current relay in accordance with, it is possible to prevent the protection from malfunctioning due to the reverse power flow when a fault occurs at the power source side of the protection relay.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for preventing reverse power flow of an over current relay, the apparatus comprising:
    a detecting unit which detects a phase current and a neutral line current;
    a reverse power flow determining unit which is electrically connected to the detecting unit and compares the phase current and the neutral line current which are detected by the detecting unit with each other to determine whether or not a reverse power flow occurs;
    a setting unit which is electrically connected to the reverse power flow determining unit and sets an operation time and the number of operation times of a protection relay; and
    an operation unit which is electrically connected to the setting unit and operates the protection relay in a manner set by the setting unit.

2. The apparatus of claim 1, further comprising a blocking relay which prevents the protection relay from malfunctioning, wherein the blocking relay comprises:
    a current detection terminal which is electrically connected to a terminal of a current detecting current transformer of the protection relay; and
    an operation unit which is electrically connected to a secondary side of the current detecting current transformer of the protection relay and an electronic circuit.

3. The apparatus of claim 2, wherein the reverse power flow determining unit further comprises a fault current determining circuit which compares a set current for preventing the protection relay from malfunctioning with a detection current and determines that a fault current is generated when the detection current is greater than the set current.

4. A method for preventing reverse power flow of an over current relay, the method comprising:
    detecting a phase current and a neutral line current through a detecting unit; and
    comparing the phase current with the neutral line current to determine whether or not a reverse power flow occurs and determining whether or not to operate a protection relay when it is determined that the reverse power flow occurs.

5. The method of claim 4, wherein the comparing of the phase current with the neutral line current comprises:
    determining that a normal power flow occurs when the phase current is greater than the neutral line current in consideration of errors of the phase current and the neutral line current and allowing the protection relay to operate; and
    determining that the reverse power flow occurs when the neutral line current is greater than the phase current or when the power flow direction of any one phase among the three phases differs from the power flow direction of another phase among the three phases and allowing the protection relay not to operate.

6. The method of claim 4, further comprising:
    before the comparing of the phase current with the neutral line current, providing a blocking relay for preventing a malfunction of the protection relay; and
    comparing a set current with a detection current to determine that a fault current is generated when the detection current is greater than set current.

7. The method of claim 6, wherein the comparing of the phase current with the neutral line current further comprises:
    allowing the protection relay not to operate when a fault occurs at a power source side centering on the protection relay; and
    allowing the protection relay to operate when a fault occurs at a load side.

8. The method of claim 6, further comprising, after the comparing of the phase current with the neutral line current, determining that the reverse power flow occurs when the neutral line current is greater than the phase current or when the power flow direction of any one phase among the three phases differs from the power flow direction of another phase among the three phases and allowing the blocking relay to operate.

* * * * *